No. 744,242. PATENTED NOV. 17, 1903.
J. A. SCHLEHR.
NUT LOCK.
APPLICATION FILED SEPT. 29, 1902.
NO MODEL.
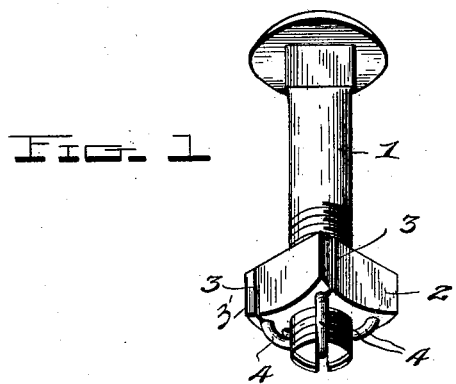
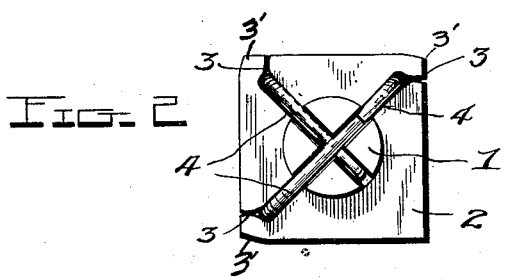
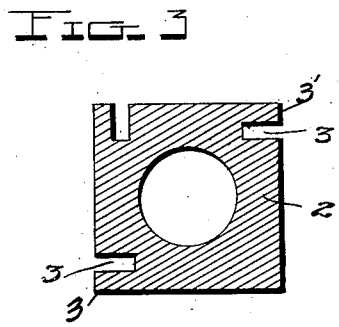
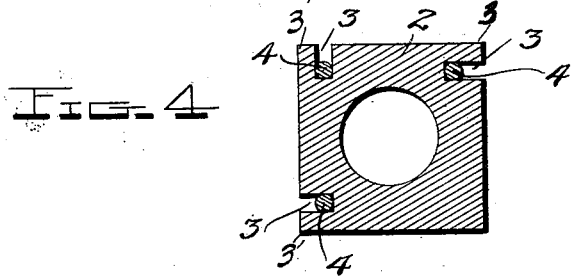
Inventor
J. A. Schlehr
Witnesses No. 744,242. Patented November 17, 1903.

UNITED STATES PATENT OFFICE.

JOSEPH ANTHONY SCHLEHR, OF FRAZEE, MINNESOTA, ASSIGNOR OF ONE-FOURTH TO WILLIAM EICHERS, OF FRAZEE, MINNESOTA.

NUT-LOCK.

SPECIFICATION forming part of Letters Patent No. 744,242, dated November 17, 1903.

Application filed September 29, 1902. Serial No. 125,294. (No model.)

*To all whom it may concern:*

Be it known that I, JOSEPH ANTHONY SCHLEHR, a citizen of the United States, residing at Frazee, in the county of Becker and State of Minnesota, have invented certain new and useful Improvements in Nut-Locks; and I do declare the following to be a full, clear, and exact description of the invention, such as will enable others skilled in the art to which it appertains to make and use the same.

The invention relates to nut-locks.

The object of the invention is to provide means for securely locking a nut to a bolt so that the nut will not accidentally work loose, while at the same time when desired the nut may be unscrewed from the bolt by disengaging the locking means therefrom.

With this and other objects in view the invention consists in certain features of construction and combination of parts, which will be hereinafter fully set forth.

In the accompanying drawings, Figure 1 is a perspective view of a bolt, nut, and the locking means adjusted to lock the nut to the bolt. Fig. 2 is an end view. Fig. 3 is a transverse sectional view through the nut before the locking means have been engaged therewith. Fig. 4 is a similar view after the locking means have been placed in the kerfs in the nut and before the walls of the kerfs have been compressed to secure the locking means in place.

In the drawings, 1 denotes a bolt provided with one or more slots in its screw-threaded end, and 2 denotes the nut. The nut has one or more kerfs 3 formed in it, preferably at its corners, which receive metal pins or wires 4. After the metal pins or wires 4 have been inserted in the kerfs the walls 31 of the kerfs, which form bendable tangs, are compressed to firmly and securely bind the pins or wires in place. It will be observed that the slots are of a length greater than the width or diameter of the pins or wires and that consequently when the tangs are upset or hammered down the inner portions thereof will clamp the pins or wires, while the outer free ends thereof will approximately close the kerfs, thus holding the pins or wires from movement in either direction transversely or longitudinally of the bolt.

In operation the nut is screwed upon the bolt the desired distance and the pins or wires bent into engagement with the slots in the end of the bolt, thus securely locking the nut against rotation in either direction.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

In combination with a slotted bolt, a nut having a kerf or slot adjacent to one of its corners, forming a linear bendable tang, and a key engaging the slots in the bolt and nut and confined by the tang, the latter being upset to bear upon the key and to close or approximately close the slot between the key and side of the nut, substantially as described.

In testimony whereof I have hereunto set my hand in presence of two subscribing witnesses.

JOSEPH ANTHONY SCHLEHR.

Witnesses:
  L. W. OBERHAUSEN,
  C. H. SLETTEN.